(12) United States Patent
Kasamatsu et al.

(10) Patent No.: US 6,420,070 B1
(45) Date of Patent: Jul. 16, 2002

(54) NONAQUEOUS ELECTROLYTE SECONDARY BATTERY AND ITS ANODE

(75) Inventors: Shinji Kasamatsu; Yoshiaki Nitta; Hiroki Muraoka, all of Osaka; Shoichiro Watanabe, Nara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/154,796

(22) Filed: Sep. 17, 1998

(30) Foreign Application Priority Data

Sep. 19, 1997 (JP) .............................. 9-254534

(51) Int. Cl.⁷ .............................................. H01M 4/48
(52) U.S. Cl. ................. 429/231.8; 429/231.4; 423/445 R
(58) Field of Search .................... 429/231.4, 231.8; 423/445 R, 447.9, 448

(56) References Cited

U.S. PATENT DOCUMENTS

| | | | | |
|---|---|---|---|---|
| 5,153,082 A | * | 10/1992 | Ogino et al. ................ | 429/194 |
| 5,187,035 A | * | 2/1993 | Miyabayashi et al. ...... | 429/218 |
| 5,426,006 A | * | 6/1995 | Delnick et al. ............. | 429/218 |
| 5,612,155 A | * | 3/1997 | Takami et al. ............. | 429/218 |
| 5,700,298 A | | 12/1997 | Shi et al. ................... | 29/623.1 |
| 5,721,071 A | * | 2/1998 | Sonobe et al. ............. | 429/218 |

FOREIGN PATENT DOCUMENTS

| | | |
|---|---|---|
| EP | 0 691 599 | 1/1996 |
| JP | 4-190556 | 7/1992 |
| JP | 4-190557 | 7/1992 |
| JP | 06318459 | 11/1994 |
| JP | 08083609 | 3/1996 |
| JP | 08096794 | 4/1996 |
| JP | 08180873 | 7/1996 |

OTHER PUBLICATIONS

Cullity, "Elements of X–Ray Diffraction, 2nd edition", Addison Wesley, publishers, p. 401. (no month), 1978.*

* cited by examiner

*Primary Examiner*—Carol Chaney
(74) *Attorney, Agent, or Firm*—Ratner & Prestia (57) ABSTRACT

Using a graphite material capable of intercalating and de-intercalating lithium ions as the anode, the peak intensity ratio $R(=I(110)/I(004))$ corresponding to lattice planes (110) and (004) of graphite material obtained by wide angle X-ray diffraction measurement of this anode is in a range of 0.05 to 0.5. Hence, edges of graphite crystals exist adequately on the electrode surface at the interface to the electrolyte, and therefore intercalation of lithium proceeds smoothly, polarization at the time of charging and discharging is suppressed, and a nonaqueous electrolyte secondary battery excellent in high rate discharging characteristic is obtained. The obtained battery is small in deterioration if charging and discharging are repeated.

24 Claims, 1 Drawing Sheet

NONAQUEOUS ELECTROLYTE SECONDARY BATTERY AND ITS ANODE

2. BACKGROUND OF THE INVENTION

2.1 Field of the Invention

The present invention relates to an anode made of a graphite material capable of intercalating and de-intercalating lithium ions, and a nonaqueous electrolyte secondary battery using the same.

2.2 Description of the Prior Art

In the recent trend of rapid progress in portable and cordless structure of consumer electronic appliances, the lithium secondary battery is noticed as their driving power source.

Hitherto, as the materials for anode of lithium secondary battery, lithium metal, lithium alloy, and carbon capable of intercalating and de-intercalating lithium ions have been discussed, but the former two materials produce dendritic lithium or fine lithium alloy respectively along with process of charging and discharging of battery, possibly leading to internal short-circuit of battery. Recently, therefore, the lithium ion battery using carbon is in the mainstream of merchandise.

When carbon is used as the anode, since lithium is intercalated between carbon layers at the time of charging, lithium is not present on the anode surface in metal state, and it is hence said that the safety of the battery may be enhanced.

Among carbon, graphite is particularly small in the initial irreversible capacity, and is likely to raise the electrode density, and it is studied in various aspects.

Such graphite materials include natural graphite, and artificial graphite obtained by calcining pitch, coke or other organic material. Generally, graphite particles are composed as polycrystals of graphite crystallites with crystallite size ranging from several nm to hundreds of nm in the in-plane direction ((110) or (100) direction) or C-axis direction ((004) or (002) direction). In such graphite particles, the C-axis of crystallites tends to face nearly same direction, and the same tendency is noted in the particles after grinding and sieving. Accordingly, the in-plane direction and C-axis direction are respectively uniform as if entire graphite particles were one crystallite.

When grinding the graphite in order to reduce the particle size, the graphite is likely to be cleaved by the shearing force between layers, that is, in the in-plane direction of crystal. Usually, therefore, the graphite particles ground to particle size of scores of microns are shaped like scales, the particle size is small in the C-axis direction of crystallite, and the aspect ratio of particle size in the in-plane direction of crystallite and particle size of C-axis direction tends to be larger.

Using such graphite material as the anode material, when paste is prepared together with binder and others and applied and rolled on the current collector, the filling density of graphite material in the electrode is raised, and owing to the large aspect ratio of particles in the in-plane direction and C-axis direction, the C-axis direction of particles tends to coincide with the vertical direction of the current collector. That is, the basement surface of crystallite in the graphite particles (C-axis (004) or (002) direction) tends to orient in the same direction as the surface of the current collector.

The orientation of graphite material in the electrode can be known from the peak intensity ratio R of the diffraction line (110) in the in-plane direction obtained from the wide-angle X-ray diffraction and the diffraction line (004) in the C-axis direction.

$$R = \frac{(110) \text{ peak integral intensity } I \ (110)}{(004) \text{ peak integral intensity } I \ (004)}$$

The intensity ratio R of graphite material measured in the powder state before application is measured in a state in which each particle does not have orientation in the measuring surface of wide angle X-ray diffraction, and therefore the obtained value corresponds to the size ratio of crystal size in the in-plane direction of graphite material and crystal size in C-axis direction. By contrast, in the electrode prepared by applying and rolling paste compound of graphite material on the current collector, the basement surface of graphite particles tends to orient in the same direction as the current collector surface. Therefore, crystallites composing graphite particles also orient according to the orientation of particles, and when the electrode surface is measured by X-ray, as compared with the powder state before application, the peak intensity I (110) of the in-plane direction of crystallites is weak, and the peak intensity I (004) in the C-axis direction is strong, so that the peak intensity ratio R varies. Thus, from the change in the peak intensity ratio R of wide angle X-ray diffraction, the degree of orientation of particles in the electrode may be known.

When the conventional electrode was measured in the above method, the peak intensity ratio R was about 0.01 to 0.05, and the ratio $P(=R/R_o)$ of R to the peak intensity ratio $R_o$ obtained from the powder before preparation of electrode was about 0.05.

In such electrode, on the electrode surface at the interface to the electrolyte, the ratio of existence of the basement surface of graphite crystal is large, while the ratio of existence of edge of graphite crystal inducing intercalation of lithium ions is small. Hence, in charging and discharging reaction, lithium ions cannot move smoothly at the interface of electrolyte and electrode, and polarization is likely to occur, and therefore favorable high rate charging and discharging characteristic or charging and discharging cycle characteristic cannot be obtained.

To solve such problems, as disclosed in Japanese Laid-open Patent No. 4-190556, Japanese Laid-open Patent No. 4-190557, and Japanese Laid-open Patent No. 6-318459, for example, it has been proposed to reduce the crystal size ratio (aspect ratio) in the in-plane direction and C-axis direction of graphite crystallites. In spite of these proposals, however, the problems are not solved completely, and in particular nothing is considered about restriction of orientation of graphite particles on the electrode.

In Japanese Laid-open Patent No. 8-83609 or Japanese Laid-open Patent No. 8-180873, graphites having various particle shapes are proposed, but nothing is still considered about restriction of orientation of graphite particles on the electrode.

The invention is devised to solve these problems, and it is hence an object thereof to present a nonaqueous electrolyte secondary battery using an anode particularly excellent in high rate discharging characteristic and charging and discharging cycle characteristic.

3. SUMMARY OF THE INVENTION

The object of the invention is to present a nonaqueous electrolyte secondary battery using an anode particularly excellent in high rate discharging characteristic and charging and discharging cycle characteristic. To achieve such object, as the anode for nonaqueous electrolyte secondary battery, the invention uses an anode mainly composed of a graphite material, with its peak intensity ratio R (=I(110)/I(004)) ranging from 0.05 to 0.5. As a result, it prevents extreme parallel orientation of crystal layer of graphite material on the current collector to the current collector plane, and enhances the high rate discharging characteristic.

Also in the anode, the ratio P (=R/$R_o$) of peak intensity ratio R obtained from the electrode prepared by applying and rolling a graphite material on a current collector and peak intensity ratio $R_o$ obtained from the powder before preparation of the electrode is in a range of 0.1 to 0.7.

It hence controls extreme orientation of graphite particles in the electrode in the electrode preparation process, and enhances the high rate discharging characteristic.

By using such anode, a nonaqueous electrolyte secondary battery excellent in high rate discharging characteristic is obtained.

The invention as set forth in claim 1 uses an electrode of which peak intensity ratio R (=I(110)/I(004)) of lattice planes (110) and (004) of graphite material obtained by wide angle X-ray diffraction of the anode for nonaqueous electrolyte secondary battery is in a range of 0.05 to 0.5.

In the anode using the graphite material of which peak intensity ratio R is in a range of 0.05 to 0.5, on the electrode surface at the interface to the electrolyte, the basement surface and edge of graphite crystals coexist adequately. Such anode is easy to manufacture, especially when graphite particles are in spheroidal or massive shape. The graphite of such particle shape is, as compared with the flake graphite, smaller in the aspect ratio of the direction corresponding to the in-plane direction of particle and the direction corresponding to the C-axis direction, and if exposed to pressure in rolling process when fabricating the electrode, the basement surface of each particle is hardly oriented uniformly in the same direction as the current collector surface. As a result, many edges of graphite crystal are present on the electrode surface. Even in the flake graphite, by adjusting the deposition condition or rolling process condition at the time of manufacture of electrode, orientation of particles in same direction can be suppressed, and it seems possible to manufacture.

In this anode, since there are adequate edges of graphite crystals on the electrode surface at the interface to the electrolyte, intercalation of lithium proceeds smoothly, and polarization during charging and discharging is suppressed, and an electrode excellent in high rate discharging characteristic is composed. Also because the move of lithium in the anode is smooth, all parts of the anode react uniformly, and deterioration is small if charging and discharging are repeated. Moreover, volume expansion or shrinkage of graphite material due to intercalation and de-intercalation of lithium ions is not specified in one direction only, and deterioration such as dropout of compound from the electrode in the charging and discharging cycles is suppressed, and an electrode excellent in cycle characteristic is composed.

By contrast, in the anode of which peak intensity ratio is less than 0.05, much basement surface of graphite crystal is present on the electrode surface at the interface to the electrolyte. Therefore, only few edges of crystals are present, and intercalation of lithium is not smooth, and polarization increase, and favorable high rate discharging characteristic and cycle characteristic are not obtained.

On the other hand, when the peak intensity ratio exceeds 0.5, the basement surface of graphite particles does not orient in a specific direction, but is present uniformly in all directions in the electrode, and electron conduction by contact of graphite particles is not obtained sufficiently, and polarization occurs, which is not preferred, too.

The invention as set forth in claim 2 is to present a nonaqueous electrolyte secondary battery of high voltage, large capacity, and excellent in high rate discharging characteristic and cycle characteristic, by combining the anode of claim 1, a cathode composed of lithiated complex oxide, and a nonaqueous electrolyte.

The invention as set forth in claim 3 relates to the nonaqueous electrolyte secondary battery of claim 2, in which the solvent of the nonaqueous electrolyte is mainly composed of two components, cyclic carbonate and chain carbonate, or three components further including aliphatic ester carbonate.

When the lithiated complex oxide is used in the cathode, the potential of the cathode is about 4 V as compared with the potential of lithium, and this is the potential for oxidizing and decomposing most organic solvents. By using the electrolyte existing stably even at such high potential, existing stably as liquid in a high temperature range, and holding a high electric conductivity, it is intended to present the nonaqueous electrolyte secondary battery further excellent in low temperature characteristic and storage characteristic.

The invention as set forth in claim 4 relates to the nonaqueous electrolyte secondary battery of claim 2, in which the cathode and anode include an organic electrolyte and a polymer for absorbing and holding the organic electrolyte, and the separator includes an organic electrolyte and a polymer for absorbing and holding the organic electrolyte, same as in the cathode and anode. In such battery composition, a battery of high performance and flexible shape is realized.

The invention as set forth in claim 5 is an anode, in which if the peak intensity ratio of lattice planes (110) and (004) of graphite material obtained by wide angle X-ray diffraction is R (=I(110)/I(004)), the ratio P (=R/$R_o$) of measurement R of the anode formed by applying and rolling graphite material on an current collector, and measurement $R_o$ of the powder before fabrication of electrode is in a range of 0.1 to 0.7.

The electrode of which ratio P is in a range of 0.1 to 0.7 is relatively smaller in the change of R as compared with that of the powder before fabrication of electrode. It is likely to settle in this range when the graphite material is particles in spheroidal or bulk shape. This is because the aspect ratio is smaller as compared with the flake graphite, and if exposed to pressure in the rolling process in fabrication of electrode, the basement surface of each particle is hardly oriented in the same direction as the current collector surface. Or, if the graphite material is scaly particles large in aspect ratio and likely to orient, orientation of particles in same direction may be suppressed by the deposition condition or rolling process condition in electrode fabrication. In such electrode, crystallites are not oriented in a specific direction, and many edges of graphite crystals are present on the electrode surface, and lithium ions are likely to be intercalated, and moving in the electrode is considered to be smooth. As a result, favorable high rate discharging characteristic and favorable cycle characteristic may be obtained. Moreover, since expansion and shrinkage of graphite materials due to intercalation and de-intercalation of lithium ions are not specified in one direction only, deterioration of electrode strength such as dropout of compound due to repeated charging and discharging can be suppressed, and an electrode excellent in cycle characteristic is composed.

In the electrode of which ratio P is less than 0.1, the orientation of graphite particles differs significantly before and after electrode fabrication, and in the graphite particles after electrode fabrication, the basement surface of crystals is oriented in the same direction as the current collector surface. Accordingly, at the interface to the electrolyte, intercalation of lithium ions is not smooth, and polarization is likely to occur, and favorable high rate discharging characteristic and cycle characteristic are not obtained.

In the electrode of which ratio P exceeds 0.7, as compared with the powder before electrode fabrication, although the change of R is smaller, the rolling process is not enough, and the filling density of graphite is low. Hence, the contact between particles is insufficient, and sufficient electron conduction is not achieved, and polarization increases to lower the initial capacity, which is not preferred. Therefore, the ratio P must be 0.1 or more and 0.7 or less, and more preferably 0.2 or more to 0.5 or less.

The invention as set forth in claim 6 is to present a nonaqueous electrolyte secondary battery of high voltage, large capacity, and excellent in high rate discharging characteristic and cycle characteristic, by combining the anode of claim 5, a cathode composed of lithiated complex oxide, and a nonaqueous electrolyte.

The invention as set forth in claim 7 relates to the nonaqueous electrolyte secondary battery of claim 6, in which the solvent of the nonaqueous electrolyte is mainly composed of two components, cyclic carbonate and chain carbonate, or three components further including aliphatic ester carbonate. When the lithiated complex oxide is used in the cathode, the potential of the cathode is about 4 V as compared with the potential of lithium, and this is the potential for oxidizing and decomposing most organic solvents. By using the electrolyte existing stably even at such high potential, existing stably as liquid in a high temperature range, and holding a high electric conductivity, it is intended to present the nonaqueous electrolyte secondary battery further excellent in low temperature characteristic and storage characteristic.

The invention as set forth in claim 8 relates to the nonaqueous electrolyte secondary battery of claim 6, in which the cathode and anode include an organic electrolyte and a polymer for absorbing and holding the organic electrolyte, and the separator includes an organic electrolyte and a polymer for absorbing and holding the organic electrolyte, same as in the cathode and anode. In such battery composition, a battery of high performance and flexible shape is realized.

The graphite material used in the anode is not particularly limited, and includes, for example, ground and sieved natural graphite, artificial graphite obtained by calcining pitch, coke or other organic material, mixing with binder pitch, forming, and graphitizing at 2000 to 3000° C., being ground and sieved into bulk or scale particle shape, or spheroidal graphite obtained by graphitizing the spherulite obtained from meso-phase pitch. Incidentally, also in the condition heightened in the filling density when fabricating the electrode, the orientation of particles can be suppressed, and for manufacturing a battery using an electrode of high filling density, spheroidal graphite or bulk graphite of which particle shape is close to cube is preferred. Further, the bulk graphite is preferred for manufacturing a battery having a high initial capacity because the graphitizing degree of graphite material is high and the reversible capacity is large.

As the graphite material, the lattice distance d002 of lattice plane (002) by wide angle X-ray diffraction is preferred to be 3.35 angstroms or more and 3.37 angstroms or less. In the graphite material exceeding 3.37 angstroms, the graphitizing degree is low, and the lithium intercalating reversible capacity drops, and higher capacity is not expected. The median diameter $D_{50}$ is preferred to be 10 to 20 microns. Hence the filling density is enhanced, and the electrode excellent in coating and roller performance can be fabricated. To suppress the side reaction occurring in decomposition of electrolyte or the like on the electrode surface, the specific surface area determined by the BET adsorption method is preferred to be 2.0 to 5.0 $m^2/g$.

The wide angle X-ray diffraction was measured by using CuK α as X-ray source by means of RINT-2500 (manufactured by RIGAKU DENKI). For measurement of electrode, a part of the electrode was cut out, and adhered to a sample holder and measured. As for graphite powder, according to the measuring method using a sample having no orientation in any direction (Guideline of X-ray Diffraction, RIGAKU DENKI, p. 42), as amorphous substance, silica gel powder was mixed in the sample by about 50%, blended and ground in an agate mortar, and charged into a sample holder and measured. As the graphite powder used at this time, the powder before fabrication of anode may be used, or the compound of electrode after fabrication may be collected, and used after sufficient separation between particles in a mortar before measurement. When measuring the wide angle X-ray diffraction of electrode and powder, the sample surface for incident X-ray is a plane, its surface coincides with the axis of rotation of goniometer, so that there is no measuring error in diffraction angle or intensity.

In the rolling process of electrode, any pressing technique may be employed, and a roller press, for example, is preferably used.

As the cathode material to be combined with the anode, any metal oxide containing lithium may be used as far as lithium can be intercalated and de-intercalated, and in particular those showing high potential of 4 V class are effective from the viewpoint of high energy density, and examples include $LiCoO_2$, $LiNiO_2$, and $LiMn_2O_4$.

As the organic solvent, preferably, the cyclic carbonate includes ethylene carbonate (EC), propylene carbonate (PC) and butylene carbonate (BC), the chain carbonate includes dimethyl carbonate (DMC), diethyl carbonate (DEC), and ethyl methyl carbonate (EMC), and the aliphatic ester carbonate includes methyl propionate and ethyl propionate.

Examples of the electrolyte include lithium perchlorate ($LiClO_4$), lithium hexafluoride ($LiPF_6$), lithium borofluoride ($LiBF_4$), lithium arsenic hexafluoride ($LiAsF_6$), lithium trifluoromethane sulfonic acid ($LiCF_3SO_3$), lithium bistrifluoromethyl sulfonyl imide [$LiN(CF_3SO_2)_2$], and other lithium salts, which may be used either alone or in combination of several proper types, and, in particular, lithium hexafluoride ($LiPF_6$) is preferred.

The dissolving amount of the electrolyte in the organic solvent is 0.2 to 2 mol/liter, more preferably 0.5 to 1.5 mol/liter.

The polymer for absorbing and holding the organic electrolyte in claims 4 and 8 of the invention may include a polymer of which degree of crystallization of volatile organic solvent or volatile liquid after evaporation is 0 to 60 wt. %, preferably 5 to 50 wt. %, or a polymer alloy mechanically kneaded and blended, or chemically bonded partially. Above all, it is preferred to use fluorine polymer or fluorine polymer alloy. As the polymer or polymer alloy, for example, it may be formed of at least one polymer selected from fluorine substitute of ethylene and its copolymers as components for forming a crystal phase, and at least one polymer selected from fluorine substitute of propylene and fluorine substitute having silicon in the principal chain as the component for forming an amorphous phase. Examples of the polymer for forming the crystal phase include polyvinylidene fluoride (PVDF), monofluoride ethylene polymer (PVF), polychloride trifluoride polymer (PCTFE), tetrafluoroethylene polymer (PTFE), and polyethylene (PE).

On the other hand, examples of the polymer for forming the amorphous phase include polyhexafluoropropylene (PHFP), perfluoroalkyl vinyl ether (PVE), and PVMQ (material symbol by ASTM) which is a fluorine substitute polymer containing silicon bond in principal chain. However, usable materials are not limited to these examples alone. In particular, as the polymer for holding the electrolyte, it is preferred to use a fluorine polymer obtained by copolymerization of 60 to 97 wt. % of vinylidene fluoride as the component for forming the crystal phase, and 40 to 3 wt. % of hexafluoropropylene as the component for forming the amorphous phase. In the copolymer of vinylidene fluoride (VDF) and hexafluoropropylene (HFP), VDF contributes to enhancement of mechanical strength in the skeleton of the copolymer, and HFP is taken into the copolymer in an amorphous state, and functions as the portion for holding the organic electrolyte and passing of lithium ions.

As the volatile organic solvent, those evaporated quickly in the film forming process, and useful for forming of binder of favorable separator layer and positive and negative electrode layers are preferred. Specific examples include ketones (for example, acetone, methyl ethyl ketone (MEK), methyl isobutyl ketone (MIBK), methyl isoamyl ketone), carbohydrates (for example, tetrahydrofuran (THF), methyl tetrahydrofuran), esters (for example, methyl acetate, ethyl acetate), dichloromethane, 1,2-dimethoxy ethane, 1,3-dioxolan, isophorone, cyclohexanone, and other nonaqueous solvents with boiling point around 100° C. Although the boiling point is as high as 202° C., N-methyl pyrrolidone is also effective because it has a high vapor tension, and is hence volatile and large in dissolution of the polymer. A volatile liquid having affinity for the volatile organic solvent may be any material higher in boiling point than the volatile organic solvent, larger in protonic property, and lower in melting point than the polymer. Specific examples include water, alcohols, esters, and carbonates. In particular, it is preferred to use water.

In order to enhance the impregnation of organic electrolyte into the polymer by adding such volatile liquid, the volatile liquid is preferred to be added to the volatile organic solvent in which the polymer is dissolved by 0.2 wt. % or more. As the addition of the volatile liquid increases, when the separator layer surface and fracture structure after evaporation of the volatile liquid were observed by scanning electron microscope (SEM), microporous cavities are increased, and a close correlation with the increase of impregnation of electrolyte is noted. The upper limit of the addition is preferred to be 15 wt. % of the volatile nonaqueous solvent in which the polymer is dissolved. More preferably, the addition of the volatile liquid is 0.5 wt. % to 10 wt. % of the volatile nonaqueous solvent in which the polymer is dissolved.

The separator composed of the polymer containing the organic electrolyte can be manufactured in a method of adding an organic electrolyte to a polymer mixed solution composed of a volatile organic solvent in which the polymer is dissolved, and a volatile liquid having an affinity for this volatile organic solvent, and forming a film by evaporating the volatile organic solvent and volatile liquid.

As the polymer and the volatile organic solvent, the same materials as mentioned above may be used.

The same effects are obtained regardless of the shape or size of the battery, such as cylindrical, square, or flat shape.

5. DETAILED DESCRIPTION OF THE PREFERRED EMBODIMENT

The invention is described specifically below while referring to examples.

EXAMPLE 1

Figure 1:
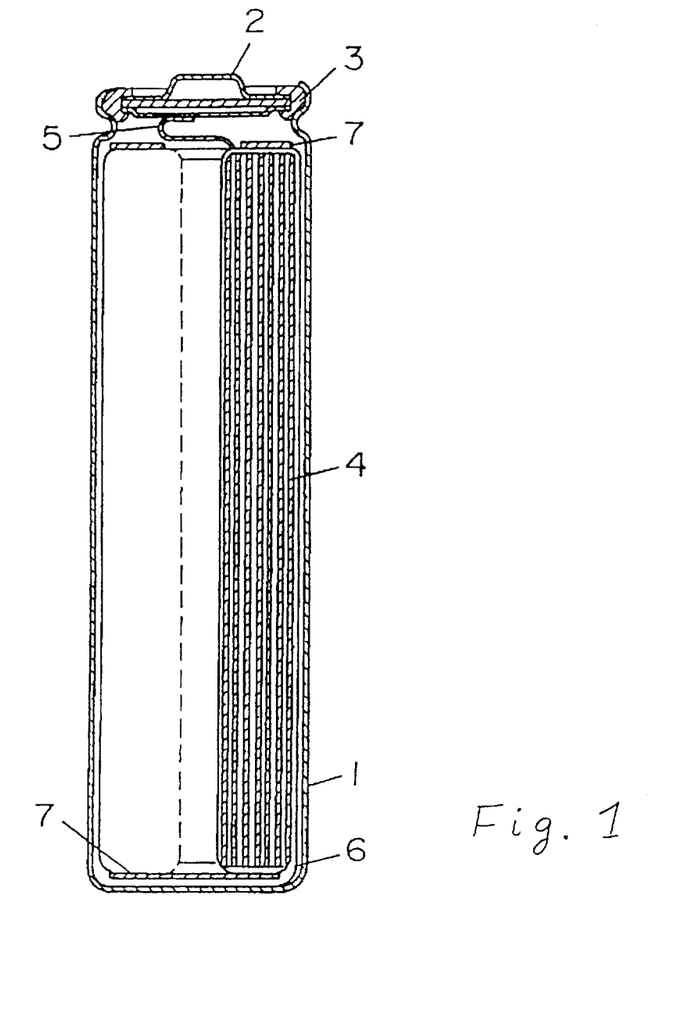
FIG. 1 is a longitudinal sectional view of a cylindrical battery for evaluation of anode.

FIG. 1 is a longitudinal sectional view of a cylindrical battery used in this example. In the diagram, reference numeral 1 is a battery case prepared by processing a stainless steel plate having resistance to organic electrolyte, 2 is a seal plate having a safety valve, and 3 is an insulating packing. Reference numeral 4 is an electrode group having a cathode and an anode spirally wound through a separator, and it is accommodated in the case 1. From the cathode, a cathode lead 5 is drawn out and connected to the seal plate 2, and from the anode, an anode lead 6 is drawn out and connected to the bottom of the battery case 1. Reference numeral 7 is an insulating ring, which is provided in the upper and lower parts of the electrode group 4. The cathode and anode are specifically described below.

The cathode is composed of 100 parts by weight of $LiCoO_2$ powder synthesized by mixing $Li_2Co_3$ and $Co_3O_4$ and calcining for 10 hours at 900° C., 3 parts by weight of acetylene black, and 7 parts by weight of fluoroplastic binder 7, which were mixed and suspended in an aqueous solution of carboxy methyl cellulose and formed into paste. This paste was applied on both sides of an aluminum foil of 0.03 mm in thickness, dried and rolled, and a positive electrode of 37 mm in width, and 240 mm in length was fabricated.

The anode is of a graphite compound prepared by carbonizing petroleum coke, mixing with binder pitch, forming, and graphitizing at 2800° C. to obtain artificial graphite, and grinding and sieving it, and forming into graphite having a massive particle shape.

To 100 parts by weight of this massive-shaped graphite, 3 parts by weight of styrene/butadiene rubber was mixed, and the mixture was suspended in an aqueous solution of carboxymethyl cellulose to be formed into paste. This paste was applied on both sides of a copper foil of 0.02 mm in thickness, and dried. This anode was rolled several times by means of a roller press, and a negative electrode of 0.20 mm in thickness, 39 mm in width, and 260 mm in length was prepared. Part of this electrode was later cut out, and measured as sample of wide angle X-ray diffraction, and the intensity ratio R of (110) and (004) was 0.07.

The cathode was provided with an aluminum lead, and the anode with a nickel lead, respectively, and both were spirally wound through a polypropylene separator of 0.025 mm in thickness, 45 mm in width, and 730 mm in length, and an electrode group was composed, and this electrode group was put into a battery case of 14.0 mm in diameter and 50 mm in height. The electrolyte was prepared by dissolving 1 mol/liter of $LiPF_6$ into a solvent mixing EC and DEC by 1:1 by volume, and after filling with this, the seal was closed, and cell A of the invention was completed.

EXAMPLE 2

The negative electrode and battery were fabricated in the same manner as in example 1 except that massive graphite obtained by grinding and sieving natural graphite was used as the graphite material, and cell B of the invention was completed. Part of the electrode was cut out and used as the sample for measurement of wide angle X-ray diffraction, and the intensity ratio R of (110) and (004) was determined.

EXAMPLE 3

The negative electrode and battery were fabricated in the same manner as in example 1 except that spheroidal graphite made of meso-phase pitch obtained by graphitizing at 2800° C. was used as the graphite material after grinding and sieving, and cell C of the invention was completed. Part of the electrode was cut out and used as the sample for measurement of wide angle X-ray diffraction, and the intensity ratio R of (110) and (004) was determined.

Comparative Example 1

The negative electrode and battery were fabricated in the same manner as in example 1 except that flake graphite was used as the graphite material, and cell D for comparison was completed. Part of the electrode was cut out and used as the sample for measurement of wide angle X-ray diffraction, and the intensity ratio R of (110) and (004) was determined.

Comparative Example 2

The negative electrode and battery were fabricated in the same manner as in example 1 except that rolling was not executed when fabricating the negative electrode by using spheroidal graphite made of meso-phase pitch obtained by graphitizing at 2800° C. as the graphite material after grinding and sieving, and cell E for comparison was completed. Part of the electrode was cut out and used as the sample for measurement of wide angle X-ray diffraction, and the intensity ratio R of (110) and (004) was determined.

EXAMPLE 4

Figure 2:
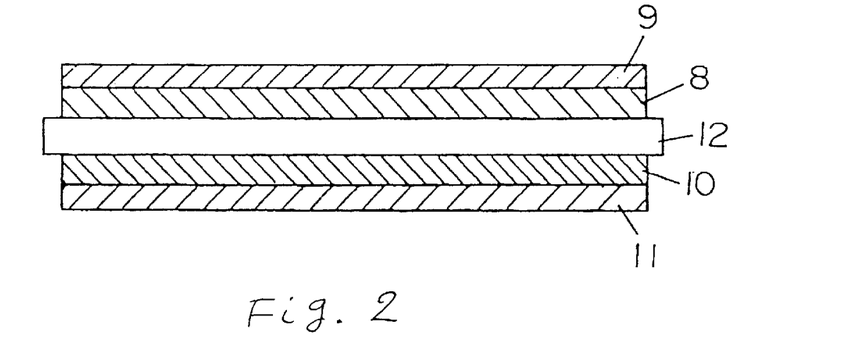
FIG. 2 is a longitudinal sectional view of a thin battery for evaluation of anode.

FIG. 2 shows a sectional structure of a thin type battery used in the embodiment. In FIG. 2, reference numeral 8 is a cathode sheet, 9 is a cathode current collector, 10 is an anode sheet, 11 is an anode current collector, and 12 is a separator.

The cathode sheet 8 was prepared in the following procedure. First, a copolymer of vinylidene fluoride and propylene hexafluoride (P(VDF-HFP), ratio of propylene hexafluoride by 12 wt. %) was dissolved by 140 g in 640 g of acetone, and 220 g of dibutyl phthalate (DBP) was added and stirred, and a polymer solution for electrode was prepared. Next, 754 g of $LiCO_2$ as active material, and 40 g of acetylene black (AB) as electric conductor were mixed, and 425 g of acetone was added and kneaded for 30 minutes, and 430 g of the prepared polymer solution for electrode was gradually added in the course of one hour and mixed, and a cathode paste was obtained. This cathode paste was applied on a glass plate in a thickness of 0.5 mm, and the acetone was dried and removed at room temperature, and a 0.22 mm sheet was prepared. It was rolled by two rollers, and blanked out into a specified size, and a cathode sheet was obtained.

To prepare an anode, consequently, petroleum coke was carbonized, mixed with binder pitch and formed, and graphitized at 2800° C. to obtain artificial graphite, which was ground and sieved to obtain graphite of massive particle shape, and to 100 g of this, 100 g of acetone was added and kneaded for 30 minutes. The above polymer paste for electrode, 145 g, was gradually added in the course of one hour and mixed, and an anode paste was prepared. This anode paste was applied on a glass plate in a thickness of 0.4 mm, and the acetone was dried and removed at room temperature, and a 0.2 mm sheet was prepared. It was rolled by two rollers, and blanked out to a specified size, and an anode sheet was obtained. At this time, part of this electrode was cut out and used as the sample for measurement of wide angle X-ray diffraction, and the intensity ratio R of (110) and (004) was 0.19.

The cathode sheet 8 and aluminum-made cathode current collector 9 were laminated, held with polytetrafluoroethylene sheets (PTFE, thickness 0.05 mm) from both sides, and heated and pressed by two rollers heated at 150° C., and a positive electrode was fabricated by thermal fusion. Incidentally, the PTFE was used for preventing the cathode sheet from sticking to the roller, and it may be replaced by other material such as copper foil or aluminum foil. Similarly, by heating and pressing the anode sheet 10 and copper-made anode current collector 11, a negative electrode was prepared by thermal fusion.

The aluminum-made cathode current collector 9 and copper-made anode current collector 11 had been preliminarily surface-treated as follows. That is, by immersing in acetone for 1 hour, the organic matter on the current collector surface was removed, and by immersing in an aqueous solution of potassium hydroxide of 10 wt. % for 1 hour, and the oxide film on the current collector surface was removed, and it was washed in ion exchange water.

Mixing 3 g of acetylene black and 87.5 g of N-methyl pyrrolidone solution of vinylidene polyfluoride (8 wt. %), a mixture of conductive carbon material and binder was prepared. This mixture was applied on the current collector, and N-methyl pyrrolidone was dried and removed at 80° C. for 1 hour, and a surface-treated current collector was obtained.

The separator 12 was prepared in the following manner. First, mixing 40 g of P (VDF-HFP) and 200 g of acetone, 40 g of DBP was added and stirred, and a P (VDF-HFP) separator paste was prepared. This paste was applied on a glass plate in a thickness of 150 microns, and the acetone was dried and removed at room temperature, and a 0.02 mm P (VDF-HFP) separator was obtained.

Finally, the P (VDF-HFP) separator was held with the positive electrode and negative electrode, and further held by PTFE sheets, and the assembly was passed through two rollers heated at 120° C. to be heated and pressed for thermal fusion, and an integrally composed battery was fabricated.

This integrally composed battery was immersed in diethyl ether for 12 hours, and DBP was extracted and removed, and after drying for 1 hour at 50° C. in vacuum, an aluminum lead (thickness 0.1 mm) was connected to the aluminum current collector, and a copper lead (thickness 0.1 mm) to the copper current collector, respectively by spot welding.

The dried battery was put into an aluminum laminate pouch sealed except for one side, electrolyte was poured in, and vacuum impregnation for 3 minutes was conducted for three times, and by further impregnating for 10 minutes at 60° C. in vacuum, the electrolyte was poured into the battery. The electrolyte was prepared by dissolving 1 mol/liter of $LiPF_6$ in a mixed solvent of EC and DEC of 1:1 by volume.

After pouring in, the remaining side of the laminate pouch was sealed, and cell F was completed.

EXAMPLE 5

The negative electrode and battery were fabricated in the same manner as in example 4 except that massive graphite obtained by grinding and sieving natural graphite was used as the graphite material, and cell G of the invention was completed. Part of the electrode was cut out and used as the sample for measurement of wide angle X-ray diffraction, and the intensity ratio R of (110) and (004) was determined.

Comparative Example 3

The negative electrode and battery were fabricated in the same manner as in example 4 except that flake graphite was used as the graphite material, and cell H for comparison was completed. Part of the electrode was cut out and used as the sample for measurement of wide angle X-ray diffraction, and the intensity ratio R of (110) and (004) was determined.

Preparing three cells each of cells A, B, C, F, G of the invention and cells D, E, H for comparison, the initial capacity, high rate discharging capacity, and cycle characteristic were measured. As the charging and discharging condition, at 20° C., the limiting current was 350 mA in cells A, B, C, D, E, and constant voltage charging was conducted at charging voltage of 4.1 V and charging time of 2 hours, and in discharging, the discharging current was 100 mA in the initial charging and discharging test, and the discharging current was 1000 mA in the high rate discharging test. In cells F, G, H, the constant current charging was 20 mA, and the charging voltage was cut at 4.2 V, and in discharging, the discharging current was 20 mA in the initial charging and discharging test, and the discharging current was 200 mA in the high rate discharging test. To evaluate the high rate discharging characteristic, the ratio of initial discharging capacity and high rate discharging capacity was determined. As the cycle characteristic test, in cells A, B, C, D, E, at discharging current of 500 mA, constant current discharging at discharging end voltage of 3.0 V was conducted, and in cells F, G, H, at discharging current of 100 mA, constant current discharging at discharging end voltage of 3.0 V was conducted. To evaluate the cycle characteristic test, the cycle life was determined at the point of deterioration to less than the half of the initial capacity. The results are compiled in Table 1.

TABLE 1

| Cell | Graphite material | R I(110)/(004) | High rate discharging characteristic (%) | Cycle life (cycles) |
| --- | --- | --- | --- | --- |
| Example 1-A | Massive graphite | 0.07 | 97 | 620 |
| Example 2-B | Massive graphite | 0.13 | 90 | 550 |
| Example 3-C | Spheroidal graphite | 0.45 | 93 | 680 |
| Example 4-F | Massive graphite | 0.19 | 87 | 530 |
| Example 5-G | Massive graphite | 0.09 | 84 | 510 |
| Comparative example 1-D | Flake graphite | 0.01 | 65 | 200 |
| Comparative example 2-E | Spheroidal graphite | 0.60 | 80 | 410 |
| Comparative example 3-H | Flake graphite | 0.03 | 68 | 350 |

Cells A, B, C, F, G of the invention were excellent in high rate discharging characteristic, and long in cycle life, exceeding 500 cycles. In cells D, E and H, however, excellent high rate discharging characteristic and cycle characteristic were not obtained. The graphite material used in the anode of cells D and H had a scaly particle shape, and the orientation of the anode was extremely high at the time of manufacture of electrode, and the existence ratio of edges in the in-plane direction of particles contributing to intercalation decreased on the interface to the electrolyte, which seems to cause to lower the high rate discharging characteristic and cycle characteristic. In cell E, the anode was not oriented, and there were sufficient edges on the electrode interface, but since the rolling process was not enough, the electron conductivity was lowered by contact between particles, and polarization was increased due to diffusion of lithium ions, which seems to cause to lower the high rate discharging characteristic and cycle characteristic.

Hence, by using the anode of which peak intensity ratio R (=I(110)/I(004)) of lattice planes (110) and (004) of graphite material obtained by wide angle X-ray diffraction measurement is in a range of 0.05 to 0.5, graphite particles are close to the state free from orientation of particles as observed in the graphite powder before fabrication of electrode, so that a nonaqueous secondary battery having excellent high rate discharging characteristic and cycle characteristic may be presented.

EXAMPLE 6

The negative electrode and battery were fabricated in the same manner as in example 1 except that massive graphite obtained by grinding and sieving artificial graphite was used as the graphite material, and cell I of the invention was completed. This massive graphite was measured as sample of wide angle X-ray diffraction in the powder form before fabrication of electrode, and the intensity ratio of (110) and (004) was $R_o$=0.43. Part of the electrode was cut out after fabrication of electrode, and similarly measured, and the result was R=0.07. Hence, the rate of change when the electrode was manufactured from the powder before fabrication of electrode was P=0.19.

EXAMPLE 7

A battery was fabricated in the same manner as in example 6, by using the same graphite material as in example 6, except that the anode thickness was 0.19 mm by rolling, and cell J of the invention was completed. The rate of change when the electrode was manufactured from the powder state of the massive graphite was P=0.12.

Comparative Example 4

A battery was fabricated in the same manner as in example 6, by using the same graphite material as in example 6, except that the anode thickness was 0.18 mm by rolling, and cell K for comparison was completed. The rate of change when the electrode was manufactured from the powder state of the massive graphite was P=0.07.

Comparative Example 5

The negative electrode and battery were fabricated in the same manner as in example 6, except that rolling was not done when fabricating the anode by using the same graphite material as in example 6, and cell L for comparison was completed. The rate of change when the electrode was manufactured from the powder state of the massive graphite was P=0.86.

EXAMPLE 8

A battery was fabricated in the same manner as in example 4, by using flake graphite material, except that the anode thickness was 0.20 mm by rolling, and cell M of the invention was completed. The rate of change when the electrode was manufactured from the powder state of the flake graphite was P=0.15.

Comparative Example 6

A battery was fabricated in the same manner as in example 6, by using the flake graphite material as in example 8, except that the anode thickness was 0.19 mm by rolling, and cell N for comparison was completed. The rate of change when the electrode was manufactured from the powder state of the flake graphite was P=0.04.

EXAMPLE 9

The anode and nonaqueous electrolyte battery were fabricated in the same manner as in example 4 by using massive graphite obtained by grinding and sieving artificial graphite as the graphite material, and cell O of the invention was completed. This massive graphite was measured as sample of wide angle X-ray diffraction in the powder form before fabrication of electrode, and the intensity ratio of (110) and (004) was $R_o=0.43$. Part of the electrode was cut out after fabrication of electrode, and similarly measured, and the result was R=0.19, and the rate of change when the electrode was manufactured from the powder before fabrication of electrode was P=0.44.

Comparative Example 7

A battery was fabricated in the same manner as in example 9, by using the same graphite material as in example 4, except that the anode thickness was 0.18 mm by rolling, and cell P for comparison was completed. The rate of change when the electrode was manufactured from the powder state of the massive graphite was P=0.09.

Preparing three cells each of cells I to P of examples of the invention and for comparison, the initial capacity, high rate discharging capacity, and cycle characteristic were measured same as in example 1. The results are compiled in Table 2.

TABLE 2

| Cell | Graphite material | P | R/Ro | High rate discharging characteristic (%) | Cycle life (cycles) |
|---|---|---|---|---|---|
| Example 6-I | Massive graphite | 0.19 | | 97 | 620 |
| Example 7-J | Massive graphite | 0.11 | | 96 | 530 |
| Example 8-M | Flake graphite | 0.15 | | 90 | 605 |
| Example 9-O | Massive graphite | 0.44 | | 87 | 527 |
| Comparative example 4-K | Massive graphite | 0.07 | | 75 | 416 |
| Comparative example 5-L | Massive graphite | 0.86 | | 78 | 390 |
| Comparative example 6-N | Flake graphite | 0.04 | | 79 | 426 |
| Comparative example 7-P | Massive graphite | 0.09 | | 74 | 430 |

Cells I, J, M, O of the invention were excellent in high rate discharging characteristic, and long in cycle life, exceeding 500 cycles. In cells K, L, N, P, however, excellent high rate discharging characteristic and cycle characteristic were not obtained. In the anodes of cells K and P, since the rate of change P was small, the basement surface of graphite particles was oriented in the same direction as the current collector surface by rolling at the time of fabrication of the electrode, and the existence ratio of edges contributing to intercalation decreased on the electrode surface, which seems to cause to lower the high rate discharging characteristic and cycle characteristic. In cell L, since the rolling process was not enough, the electron conductivity was lowered by contact between particles, and polarization was caused. In the anode of cell N, if the electrode was fabricated in the same condition as in cell J, favorable high rate discharging characteristic and cycle characteristic were not obtained. It was because the graphite material was flake graphite having a different particle shape from the massive graphite flake graphite, and therefore even in the same condition, the rate of change of orientation was 0.04 in flake graphite as compared with 0.11 of massive graphite, and also the basement surface was oriented in the same direction as the current collector surface.

Hence, when the rate of change P of intensity ratio R by wide angle X-ray diffraction is in a range of 0.1 to 0.7, graphite particles are close to the state free from orientation of particles as observed in the graphite powder before fabrication of electrode, so that a lithium ion secondary battery or a nonaqueous secondary battery having excellent high rate discharging characteristic and cycle characteristic may be presented.

In the battery of the embodiments, $LiCoO_2$ was used as the cathode, but same effects are obtained by using the so-called rocking chair type lithiated complex oxide capable of intercalating and de-intercalating lithium, such as $LiNiO_2$, $LiMnO_2$, and $LiMn_2O_4$.

In the embodiments, the cylindrical battery and thin battery were used, but the shape is not limited, and the same effects are obtained regardless of the shape or size of the battery, such as prismatic or flat shape.

As described herein, by using the electrode obtained in the invention as the anode, a nonaqueous secondary battery excellent in high rate discharging characteristic and cycle characteristic may be presented.

What is claimed is:

1. An anode for a nonaqueous electrolyte secondary battery, the anode comprising a particulate graphite material on a current collector;

wherein:
said graphite material is capable of intercalating and de-intercalating lithium ions, said anode is prepared by applying a paste compound comprising said graphite material and a binder to said current collector, and rolling said paste material on said collector, said current collector is made of metal foil, R is in the range of 0.05 to 0.5, $R/R_o$ is in the range of 0.1 to 0.7, R is the ratio of the intensity of the peak corresponding to the (100) lattice plane of graphite material in said anode to the intensity of the peak corresponding to the (004) lattice plane of said graphite material in said anode, $R_o$ is the ratio of the intensity of the peak corresponding to the (100) lattice plane of unorientated graphite material to the intensity of the peak corresponding to the (004) lattice plane of said unorientated graphite material, obtained by a powder diffraction measurement of said unorientated graphite material before preparation of said anode, and said intensities are obtained by wide angle X-ray diffraction measurements using a diffractometer with a CuKα X-ray source.

2. The anode of claim 1 in which the median diameter $D_{50}$ of the particulate graphite material is 10 to 20 microns.

3. The nonaqueous secondary battery of claim 2 in which the lattice distance $d_{002}$ of lattice plane (002) of the graphite material, obtained by wide angle X-ray diffraction measurements using CuKα as an X-ray source, is 3.35 A or more and 3.37 A or less.

4. The anode of claim 3 in which the specific surface area by BET is 2.0 to 5.0 $m^2/g$.

5. The anode of claim 1 in which the lattice distance $d_{002}$ of lattice plane (002) of the graphite material, obtained by wide angle X-ray diffraction measurements using CuKα an an X-ray source, is 3.35 A or more and 3.37 A or less.

6. The anode of claim 5 in which the median diameter $D_{50}$ of the particulate graphite material is 10 to 20 microns, and the specific surface area by BET is 2.0 to 5.0 $m^2/g$.

7. The anode of claim 1 in which the specific surface area by BET is 2.0 to 5.0 $m^2/g$.

8. A nonaqueous electrolyte secondary battery comprising:

a cathode comprising a lithiated complex oxide, and an anode comprising a particulate graphite material on a current collector, and a nonaqueous electrolyte;

wherein:

said graphite material is capable of intercalating and de-intercalating lithium ions, said anode is prepared by applying a paste compound comprising said graphite material and a binder to said current collector, and rolling said paste material on said collector, said current collector is made of metal foil, R is in the range of 0.05 to 0.5, $R/R_o$ is in the range of 0.1 to 0.7, R is the ratio of the intensity of the peak corresponding to the (100) lattice plane of graphite material in said anode to the intensity of the peak corresponding to the (004) lattice plane of said graphite material in said anode, $R_o$ is the ratio of the intensity of the peak corresponding to the (100) lattice plane of unorientated graphite material to the intensity of the peak corresponding to the (004) lattice plane of said unorientated graphite material, obtained by a powder diffraction measurement of said unorientated graphite material before preparation of said anode, and said intensities are obtained by wide angle X-ray diffraction measurements using a diffractometer with a CuKα X-ray source.

9. The nonaqueous electrolyte battery of claim 8, wherein the nonaqueous electrolyte is an organic electrolyte having a lithium salt dissolved in an organic solvent, and said organic solvent comprises cyclic carbonate and chain carbonate.

10. The nonaqueous electrolyte battery of claim 9 in which the organic solvent additionally comprises an aliphatic ester carbonate.

11. The nonaqueous secondary battery of claim 8 in which the lattice distance $d_{002}$ of lattice plane (002) of the graphite material, obtained by wide angle X-ray diffraction measurements using CuKα as an X-ray source, is 3.35 A or more and 3.37 A or less.

12. The nonaqueous secondary battery of claim 8 in which the median diameter $D_{50}$ of the particulate graphite material is 10 to 20 microns, and the specific surface area by BET is 2.0 to 5.0 $m^2/g$.

13. A nonaqueous electrolyte secondary battery comprising:

a cathode comprising a lithiated complex oxide, an organic electrolyte, and a polymer for absorbing and holding the organic electrolyte, an anode comprising a particulate graphite material capable of intercalating and de-intercalating lithium ions, the organic electrolyte, and the polymer for absorbing and holding the organic electrolyte, and a separator comprising the organic electrolyte and the polymer for holding the electrolyte;

in which:

R is in the range of 0.05 to 0.5, $R/R_o$ is in the range of 0.1 to 0.7,

R is the ratio of the intensity of the peak corresponding to the (100) lattice plane of graphite material in said anode to the intensity of the peak corresponding to the (004) lattice plane of said graphite material in said anode, $R_o$ is the ratio of the intensity of the peak corresponding to the (100) lattice plane of unorientated graphite material to the intensity of the peak corresponding to the (004) lattice plane of said unorientated graphite material, obtained by a powder diffraction measurement of said unorientated graphite material before preparation of said anode, and said intensities are obtained by wide angle X-ray diffraction measurements using a diffractometer with a CuKα X-ray source.

14. The nonaqueous secondary battery of claim 13 in which the median diameter $D_{50}$ of the particulate graphite material is 10 to 20 microns.

15. The nonaqueous secondary battery of claim 14 in which the specific surface area by BET is 2.0 to 5.0 $m^2/g$.

16. The nonaqueous secondary battery of claim 13 in which the lattice distance $d_{002}$ of lattice plane (002) of the graphite material, obtained by wide angle X-ray diffraction measurements using CuKα as an X-ray source, is 3.35 A or more and 3.37 A or less.

17. The nonaqueous electrolyte secondary battery of claim 13 in which the median diameter $D_{50}$ of the particulate graphite material is 10 to 20 microns, and the specific surface area by BET is 2.0 to 5.0 $m^2/g$.

18. The nonaqueous electrolyte secondary battery of claim 13 in which the specific surface area by BET is 2.0 to 5.0 $m^2/g$.

19. The nonaqueous electrolyte battery of claim 13, wherein the nonaqueous electrolyte is an organic electrolyte comprising a lithium salt dissolved in an organic solvent, and said organic solvent comprises cyclic carbonate and chain carbonate.

20. The nonaqueous electrolyte battery of claim 19 in which the organic solvent additionally comprises an aliphatic ester carbonate.

21. The nonaqueous electrolyte secondary battery of claim 20 in which the median diameter $D_{50}$ of the particulate graphite material is 10 to 20 microns, and the specific surface area by BET is 2.0 to 5.0 $m^2/g$.

22. The nonaqueous secondary battery of claim 20 in which the median diameter $D_{50}$ of the particulate graphite material is 10 to 20 microns.

23. The nonaqueous secondary battery of claim 22 in which the lattice distance $d_{002}$ of lattice plane (002) of the graphite material, obtained by wide angle X-ray diffraction measurements using CuKα as an X-ray source, is 3.35 A or more and 3.37 A or less.

24. The nonaqueous electrolyte secondary battery of claim 23 in which the specific surface area by BET is 2.0 to 5.0 $m^2/g$.

* * * * *

UNITED STATES PATENT AND TRADEMARK OFFICE
CERTIFICATE OF CORRECTION

PATENT NO.    : 6,420,070 B1
DATED         : July 16, 2002
INVENTOR(S)   : Shinji Kasamatsu et al.

It is certified that error appears in the above-identified patent and that said Letters Patent is hereby corrected as shown below:

<u>Column 15,</u>
Line 12, delete "an" and insert -- as --; and

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,420,070 B1  Page 1 of 1
APPLICATION NO. : 09/154796
DATED : July 16, 2002
INVENTOR(S) : Kasamatsu et al.

It is certified that error appears in the above-identified patent and that said Letters Patent is hereby corrected as shown below:

In column 14, line 55, claim 1 of the Letter Patent, delete "100" and insert --110--.

In column 14, line 59, claim 1 of the Letter Patent, delete "100" and insert --110--.

In column 15, line 37, claim 8 of the Letter Patent, delete "100" and insert --110--.

In column 15, line 41, claim 8 of the Letter Patent, delete "100" and insert --110--.

In column 16, line 16, claim 13 of the Letter Patent, delete "100" and insert --110--.

In column 16, line 20, claim 13 of the Letter Patent, delete "100" and insert --110--.

Signed and Sealed this

Eighteenth Day of July, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,420,070 B1 | Page 1 of 1 |
| APPLICATION NO. | : 09/154796 | |
| DATED | : July 16, 2002 | |
| INVENTOR(S) | : Kasamatsu et al. | |

It is certified that error appears in the above-identified patent and that said Letters Patent is hereby corrected as shown below:

In column 14, line 55, claim 1 of the Letter Patent, delete "100" and insert --110--.

In column 14, line 59, claim 1 of the Letter Patent, delete "100" and insert --110--.

In column 15, line 36, claim 8 of the Letter Patent, delete "100" and insert --110--.

In column 15, line 40, claim 8 of the Letter Patent, delete "100" and insert --110--.

In column 16, line 16, claim 13 of the Letter Patent, delete "100" and insert --110--.

In column 16, line 20, claim 13 of the Letter Patent, delete "100" and insert --110--.

This certificate supersedes Certificate of Correction issued July 18, 2006.

Signed and Sealed this

Twelfth Day of September, 2006

JON W. DUDAS
*Director of the United States Patent and Trademark Office*